(12) United States Patent
Hegde et al.

(10) Patent No.: US 12,014,067 B2
(45) Date of Patent: Jun. 18, 2024

(54) REMOTE REPLICATION DATA EFFICIENCY OPTIMIZATION WITH HOST EXTENDED COPY COMMANDS

(71) Applicant: Dell Products L.P., Hopkinton, MA (US)

(72) Inventors: Deepika Hegde, Bangalore (IN); Jeffrey Wilson, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/963,275

(22) Filed: Oct. 11, 2022

(65) Prior Publication Data

US 2024/0118823 A1    Apr. 11, 2024

(51) Int. Cl.
   *G06F 3/06* (2006.01)
(52) U.S. Cl.
   CPC .......... *G06F 3/065* (2013.01); *G06F 3/0619* (2013.01); *G06F 3/067* (2013.01)
(58) Field of Classification Search
   CPC ........ G06F 3/065; G06F 3/0619; G06F 3/067; G06F 11/2058; G06F 11/2056; G06F 16/27
   USPC .................................. 711/162, 154
   See application file for complete search history.

(56) References Cited

U.S. PATENT DOCUMENTS

| | | | | |
|---|---|---|---|---|
| 8,725,692 B1* | 5/2014 | Natanzon | ............ | H04L 67/1097 707/610 |
| 10,459,664 B1* | 10/2019 | Dreier | .................. | G06F 16/907 |
| 2003/0126388 A1* | 7/2003 | Yamagami | .......... | G06F 11/2069 711/162 |
| 2004/0177130 A1* | 9/2004 | Chambliss | ................ | H04L 9/40 709/219 |
| 2011/0099345 A1* | 4/2011 | Mitsui | ................. | G06F 11/2069 711/E12.103 |
| 2012/0198199 A1* | 8/2012 | Liu | ...................... | G06F 12/0646 711/171 |
| 2016/0179393 A1* | 6/2016 | Masuda | .................. | G06F 3/065 711/165 |

* cited by examiner

*Primary Examiner* — Hashem Farrokh
(74) *Attorney, Agent, or Firm* — Anderson Gorecki LLP

(57) ABSTRACT

Receipt of an Xcopy command to copy data between storage objects that are both mirrored by a remote storage system prompts a local storage system to generate a remote Xcopy to prompt the remote storage system to copy the data between the remote mirrors of the storage objects, thereby avoiding transmission of the data from the local storage system to the remote storage system. If there are write-pendings or invalids on the tracks designated by the local Xcopy, then the associated data is sent to the remote storage system. Similarly, the associated data is sent if the code levels of the local and remote storage systems are incompatible.

17 Claims, 3 Drawing Sheets

REMOTE REPLICATION DATA EFFICIENCY OPTIMIZATION WITH HOST EXTENDED COPY COMMANDS

TECHNICAL FIELD

The subject matter of this disclosure is generally related to replicating changes to mirrored storage objects.

BACKGROUND

Data storage systems such as storage area networks (SANs) are used to maintain storage objects in which host application data is stored and can be contemporaneously accessed by multiple host servers. A SAN includes a network of specialized, interconnected compute nodes that manage access to arrays of non-volatile storage media such as solid-state drives (SSDs). The compute nodes respond to input-output (IO) commands from host applications that run on the host servers. Examples of host applications may include, but are not limited to, software for email, accounting, manufacturing, inventory control, and a wide variety of other business processes. A storage object or group of storage objects may be created for each host application.

It is known to configure multiple storage systems to mirror storage objects. For example, a production storage object on which active host application data is logically stored at a primary site can be synchronously replicated at a secondary site so that a primary storage array can quickly failover to a secondary storage array. The production storage objects can also be asynchronously mirrored at a disaster recovery site for use in the event of failure of the primary and secondary storage arrays.

SUMMARY

In accordance with some implementations, a method comprises: receiving, at a first storage node, an extended copy command to copy data from a first storage object to a second storage object; copying, by the first storage node, the data from the first storage object to the second storage object; sending a remote extended copy command from the first storage node to a second storage node prompting copying of the data from a first storage object mirror to a second storage object mirror; and copying, by the second storage node, the data from the first storage object mirror to the second storage object mirror.

In accordance with some implementations, an apparatus comprises: a plurality of non-volatile drives; and at least one compute node configured to manage access to a first storage object and a second storage object on the non-volatile drives and, responsive to receipt of an extended copy command to copy data from the first storage object to the second storage object, copy the data from the first storage object to the second storage object and send a remote extended copy command to a target storage node to prompt copying of the data from a first storage object mirror to a second storage object mirror.

In accordance with some implementations, a non-transitory computer-readable storage medium stores instructions that when executed by a compute node perform a method comprising: receiving, at a first storage node, an extended copy command to copy data from a first storage object to a second storage object; copying, by the first storage node, the data from the first storage object to the second storage object; sending a remote extended copy command from the first storage node to a second storage node prompting copying of the data from a first storage object mirror to a second storage object mirror; and copying, by the second storage node, the data from the first storage object mirror to the second storage object mirror.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
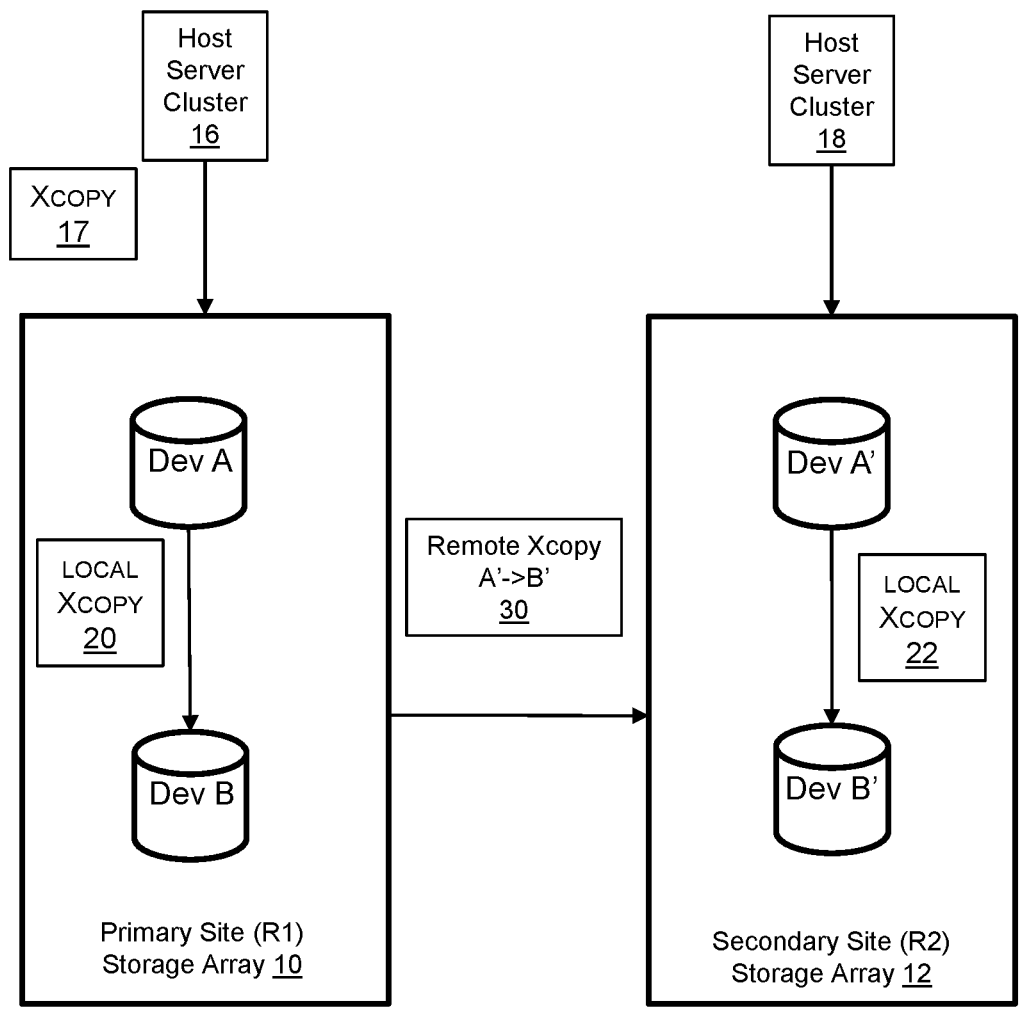
FIG. 1 illustrates remote replication of a local extended copy (Xcopy) using a remote Xcopy to maintain two pairs of mirrored storage objects.

FIG. 1 illustrates remote replication of a local extended copy (Xcopy) using a remote Xcopy to maintain two pairs of mirrored storage objects. A primary site (R1) storage array 10 is configured to provide host server cluster 16 with access to storage objects such as Dev A and Dev B. A secondary site (R2) storage array 12 is configured to provide host server cluster 18 with access to storage objects such as Dev A' and Dev B'. Dev A' is a mirror of Dev A. Dev B' is a mirror of Dev B. The mirroring is synchronous. A host-initiated Xcopy 17 prompts a local Xcopy 20 of data from Dev A to Dev B. This may occur for any of a variety of reasons such as migration of virtual machines. Because Dev B' is a mirror of Dev B, corresponding updates must be made to Dev B'.

Prior to the present invention, it was standard practice to update the remote mirror of an Xcopy target storage object by transmitting the associated data from the primary site storage array 10 to the secondary site storage array 12. During the copy of tracks of data from Dev A to Dev B, local write-protects (WPs) and remote WPs are set on individual tracks of Dev B on which data will be written. The tracks are then replicated from Dev B to Dev B' and the remote WPs are cleared. Once all the data has been copied to Dev B', a status message is sent back to the host that sent the original Xcopy command. However, transmission of data between two pairs of storage objects that are synchronously mirrored at the primary site and secondary site is inefficient and may be unnecessary because the data may already be present at the secondary site.

In the illustrated example, which improves upon the technique described above, the primary site storage array 10 receives an Xcopy 17 command from a host to copy data from Dev A to Dev B. The primary storage array recognizes that the corresponding local Xcopy 20 is between two storage objects that are both mirrored on the secondary site storage array 12. The primary site storage array checks that there are no write-pendings on the corresponding extent (track) of the source storage object, Dev A, which is an indication that the Xcopy data already exists on the remote mirror, i.e., Dev A'. The primary site storage array also checks that there are no write-pendings on the corresponding extent (track) of the target storage object, Dev B. This is to make sure the write generated due to WP on Dev B will not overwrite data copied from Dev A' to Dev B' on secondary site storage in event that the remote Xcopy command is processed before the write generated due to WP on device B. A write-pending might indicate that the track is being updated. The primary site storage array also checks that there are no Invalids on the corresponding extent (track) of the source storage object, Dev A, which is also an indication that the Xcopy data already exists on the remote mirror, i.e., Dev A'. The primary site storage array also checks that there are no Invalids on the corresponding extent (track) of the target storage object, Dev B. This is to make sure the write generated due to Invalids on Dev B may not overwrite the data copied from Dev A' to Dev B' on the secondary site storage in the event that the remote Xcopy command is processed before the write generated due to the Invalid on device B. Invalid tracks may exist when synchronization of the mirrored devices is in progress. These checks help to guarantee data atomicity on the local and remote storage arrays for the mirrored storage object. After completing these checks, the primary site storage array generates a remote Xcopy command 30 that is transmitted to the secondary site storage array to prompt a local Xcopy 22 from Dev A' to Dev B', thereby mirroring the local Xcopy 20 with local Xcopy 22 and avoiding transmission of the associated data from the primary site storage array to the secondary site storage array.

Figure 2:
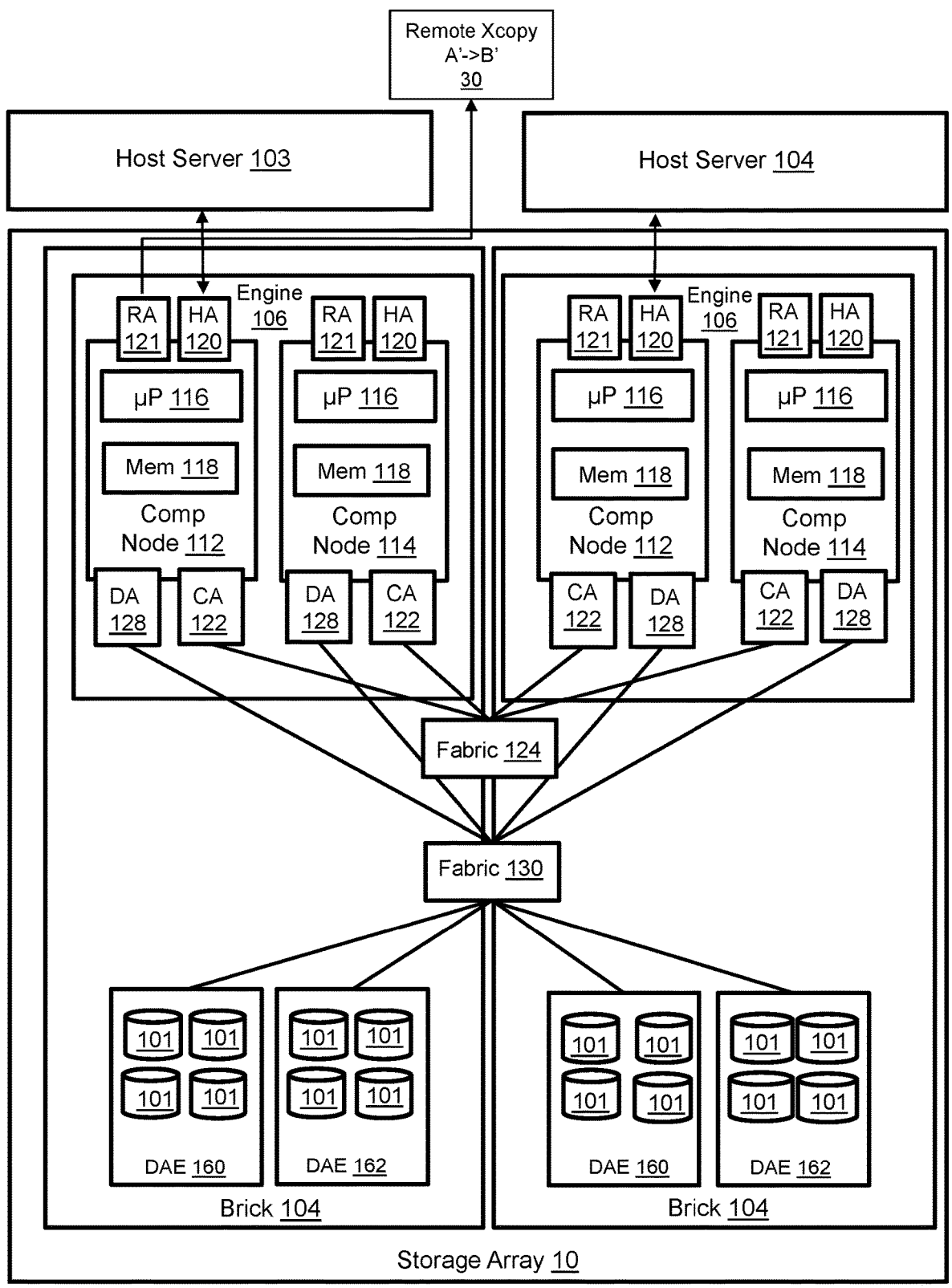
FIG. 2 illustrates the primary site storage array in greater detail.

FIG. 2 illustrates the primary site storage array 10 in greater detail. A storage array is one example of a SAN. The primary site storage array is shown supporting two host servers 103, 104 of the host server cluster 16 (FIG. 1), but the cluster would typically include more than two host servers. The host servers 103, 104 may include volatile memory, non-volatile storage, and one or more tangible processors that support instances of a host application, as is known in the art. The storage array 10 includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts 103, 104 from the compute nodes 112, 114. Nevertheless, the host applications could run on the compute nodes, e.g., on virtual machines or in containers. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers 103, 104. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems such as the secondary site storage array. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. The remote Xcopy 30 for avoiding transmission of the Xcopy data from the primary site storage array to the secondary site storage array is generated by compute nodes of the storage array and transmitted to the secondary site storage array via the RA 121.

The managed drives 101 are not discoverable by the host servers 103, 104 but the storage objects such as Dev A and Dev B (FIG. 1) that can be discovered by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers 103, 104, each production storage object is a single disk having a set of contiguous logical block addresses (LBAs) on which data used by the instances of a host application resides. However, the host application data is stored at non-contiguous addresses on various managed drives 101. A storage group of multiple production storage objects, including Dev A and Dev B, may be created for an individual host application. The compute nodes 112, 114 maintain metadata in the shared memory that maps between the LBAs of the mirrored storage objects and physical addresses on the managed drives 101 in order to process IOs from the host servers 103, 104. The basic allocation unit of storage capacity that is used by the compute nodes 112, 114 to access the managed drives 101 is a back-end track (BE TRK). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 3:
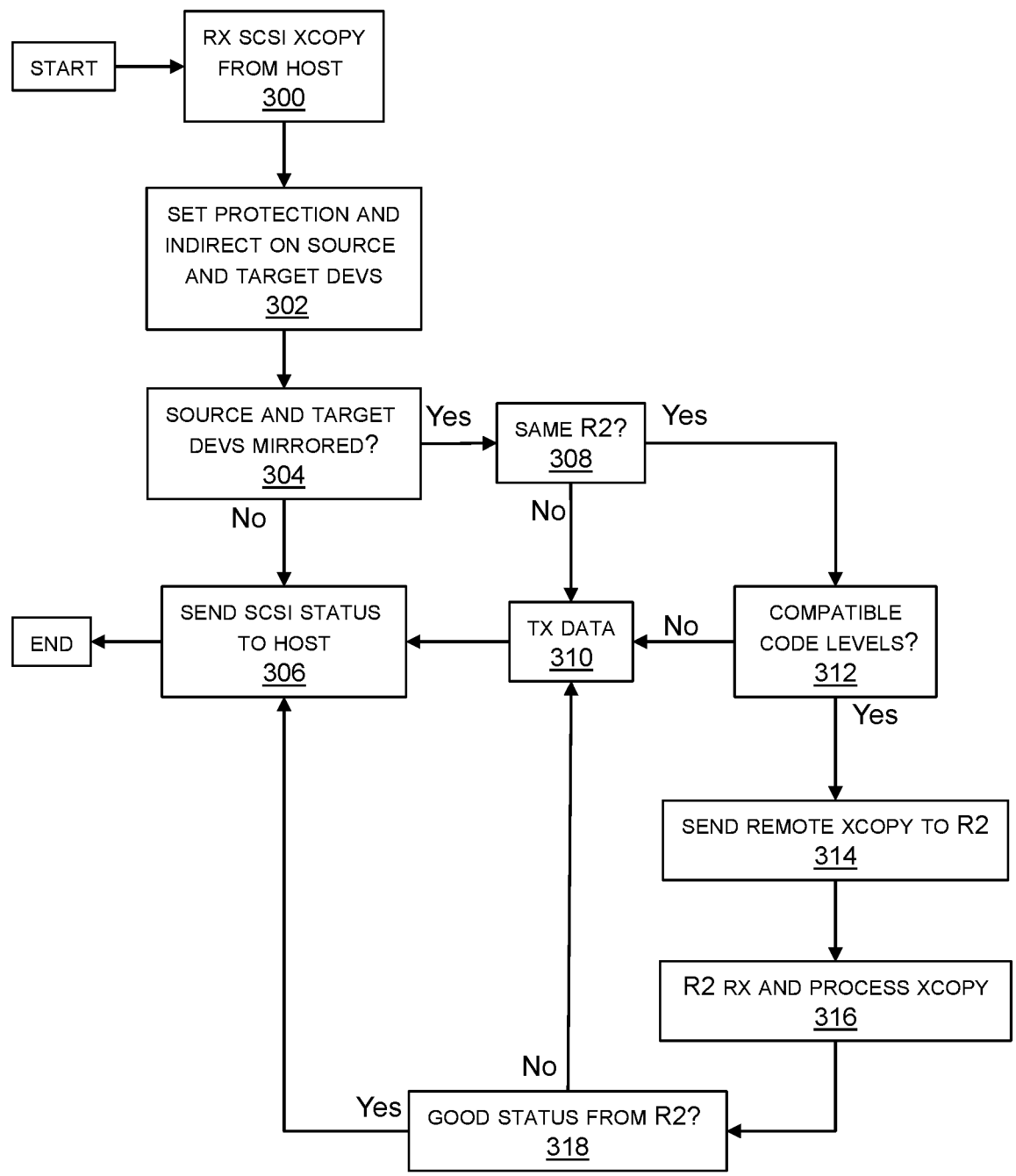
FIG. 3 illustrates a process for replicating an Xcopy between two pairs of mirrored storage objects.

FIG. 3 illustrates a process for replicating IOs between two pairs of mirrored storage objects. In step 300 a storage array receives a SCSI Xcopy command from a host. For purposes of explanation, the primary site storage array receives the SCSI Xcopy command. In step 302 the primary storage array sets protection and indirect on the source and target devices designated by the SCSI Xcopy command. This may include establishing locks on the LBAs indicated in the SCSI Xcopy command. The primary site storage array also checks that there are no write-pendings or Invalids on the corresponding tracks of the source device and target device. Step 304 is determining whether the source and target devices designated in the Xcopy command are mirrored. If either the source device or the target device is not mirrored, then the Xcopy command is serviced in the standard manner known in the art and a SCSI status message is sent to the host as indicated in step 306. If both the source device and the target device are mirrored, then step 308 is determining whether they are mirrored on the same secondary site storage array. If the source device and the target device are not mirrored on the same secondary site storage array, then Xcopy data is transmitted in tracks in the manner known in the art as indicated in step 310 and a SCSI status message is returned to the host in step 306. If the source device and the target device are mirrored on the same secondary site storage array, then step 312 is determining whether code levels are compatible at the primary and secondary sites. If the code levels at the primary site storage array and secondary site storage array are not compatible, then Xcopy data is transmitted in tracks in the manner known in the art as indicated in step 310 and a SCSI status message is returned to the host in step 306. If the code levels at the primary site storage array and secondary site storage array do match, then a remote Xcopy command is generated and sent from the primary site storage array to the secondary site storage array in step 314. The secondary site storage array receives and processes the remote Xcopy command by generating a local Xcopy as indicated in step 316. If the secondary site storage array returns a good status for implementation of the Xcopy as determined in step 318, then a SCSI status message is returned to the host in step 306. If the secondary site storage array does not return a good status for implementation of the Xcopy as determined in step 318, then Xcopy data is transmitted in tracks in the manner known in the art as indicated in step 310 and a SCSI status message is returned to the host in step 306.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   receiving, at a first storage node, an extended copy command to copy data from a first storage object to a second storage object;
   establishing locks, by the first storage node, on logical block addresses of the first storage object and the second storage object indicated in the extended copy command;
   copying, by the first storage node, the data from the first storage object to the second storage object;
   sending a remote extended copy command from the first storage node to a second storage node prompting copying of the data from a first storage object mirror to a second storage object mirror; and
   copying, by the second storage node, the data from the first storage object mirror to the second storage object mirror.

2. The method of claim 1 further comprising the first storage node determining that there are no write-pendings on tracks corresponding to the logical block addresses on the first storage object and the second storage object.

3. The method of claim 2 further comprising the first storage node determining that there are no invalids on the tracks corresponding to the logical block addresses on the first storage object and the second storage object.

4. The method of claim 3 further comprising the first storage node determining that code levels at the first storage node and the second storage node are compatible.

5. The method of claim 4 further comprising the first storage node determining that the first storage object and the second storage object are mirrored on the second storage node by the first storage object mirror and the second storage object mirror.

6. The method of claim 5 further comprising transmitting a status message indicative of completion of the extended copy command.

7. An apparatus comprising:
   a plurality of non-volatile drives; and
   at least one compute node configured to manage access to a first storage object and a second storage object on the non-volatile drives and, responsive to receipt of an extended copy command to copy data from the first storage object to the second storage object, establish locks on logical block addresses of the first storage object and the second storage object indicated in the extended copy command, copy the data from the first storage object to the second storage object and send a remote extended copy command to a target storage node to prompt copying of the data from a first storage object mirror to a second storage object mirror.

8. The apparatus of claim 7 further comprising the at least one compute node configured to determine that there are no write-pendings on tracks corresponding to the logical block addresses of the first storage object and the second storage object.

9. The apparatus of claim 8 further comprising the at least one compute node configured to determine that there are no invalids on the tracks corresponding to the logical block addresses of the first storage object and the second storage object.

10. The apparatus of claim 9 further comprising the at least one compute node configured to determine that code levels at the first storage node and the second storage node are compatible.

11. The apparatus of claim 10 further comprising the at least one compute node configured to determine that the first storage object and the second storage object are mirrored on the second storage node by the first storage object mirror and the second storage object mirror.

12. The apparatus of claim 11 further comprising the at least one compute node configured to transmit a status message indicative of completion of the extended copy command.

13. A non-transitory computer-readable storage medium storing instructions that when executed by a compute node perform a method comprising:

receiving, at a first storage node, an extended copy command to copy data from a first storage object to a second storage object;

establishing locks, by the first storage node, on logical block addresses of the first storage object and the second storage object indicated in the extended copy command;

copying, by the first storage node, the data from the first storage object to the second storage object;

sending a remote extended copy command from the first storage node to a second storage node prompting copying of the data from a first storage object mirror to a second storage object mirror; and copying, by the second storage node, the data from the first storage object mirror to the second storage object mirror.

14. The non-transitory computer-readable storage medium of claim 13 in which the method further comprises the first storage node determining that there are no write-pendings on tracks corresponding to the logical block addresses of the first storage object and the second storage object.

15. The non-transitory computer-readable storage medium of claim 14 in which the method further comprises the first storage node determining that there are no invalids on the tracks corresponding to the logical block addresses of the first storage object and the second storage object.

16. The non-transitory computer-readable storage medium of claim 15 in which the method further comprises the first storage node determining that code levels at the first storage node and the second storage node are compatible.

17. The non-transitory computer-readable storage medium of claim 16 in which the method further comprises the first storage node determining that the first storage object and the second storage object are mirrored on the second storage node by the first storage object mirror and the second storage object mirror.

* * * * *